United States Patent [19]

Wexler

[11] Patent Number: 4,620,770
[45] Date of Patent: Nov. 4, 1986

[54] MULTI-COLORED ANAGLYPHS

[76] Inventor: Howard Wexler, 300 E. 40th St., New York, N.Y. 10016

[21] Appl. No.: 594,442

[22] Filed: Mar. 30, 1984

Related U.S. Application Data

[63] Continuation-in-part of Ser. No. 545,299, Oct. 25, 1983, abandoned.

[51] Int. Cl.$^4$ .............................................. G02B 27/22
[52] U.S. Cl. .................................................... 350/132
[58] Field of Search ................................ 350/132, 130

[56] References Cited

U.S. PATENT DOCUMENTS 2,386,418 10/1945 Armbrust ............................ 350/132
4,134,644 1/1979 Marks et al. ........................ 350/132

FOREIGN PATENT DOCUMENTS 0104069 2/1917 United Kingdom ................ 350/132

*Primary Examiner*—John K. Corbin
*Assistant Examiner*—Scott J. Sugarman
*Attorney, Agent, or Firm*—Peter L. Berger

[57] ABSTRACT

Colored 3-D anaglyphs having approximately red or orange, and blue or green-blue element pairs in outline, at least some of the pairs being horizontally shifted relative to each other. The orange outline elements are colored to provide colored pictures that appear to the viewer in three dimensions when viewed through glasses having one lens approximately red in color and one lens approximately blue in color.

13 Claims, 4 Drawing Figures

MULTI-COLORED ANAGLYPHS

CROSS-REFERENCE TO RELATED APPLICATION

This application is a continuation-in-part of Application Ser. No. 545,299, inventor Howard Wexler, filed Oct. 25, 1983 now abandoned.

BACKGROUND OF THE INVENTION

This invention relates to prints or drawings that give an illusion of depth, often referred to as three dimensional or 3-D pictures. This invention particularly relates to anaglyphs that yield a 3-D image when viewed through appropriately colored lenses.

An anaglyph is a picture generally consisting of two distinctly colored, and preferably, complementary colored, prints or drwaings. The complementary colors conventionally chosen for commercial printings of comic books and the like appears to be orange and green-blue. Each of the complementary colored prints contains all elements of the picture. For example, if the picture consists of a car on a highway, then the anaglyph will be imprinted with an orange car and highway, and with a green-blue car and highway. For reasons explained below, some or all of the orange colored elements of the picture are horizontally shifted in varying amounts in the printing process relative to their corresponding green-blue elements.

The anaglyph is viewed through glasses having lenses tinted about the same colors as the anaglyph (hereinafter, "3-D glasses"). While orange and green-blue lenses are optimally used with an orange and green-blue anaglyph, red and blue lenses work satisfactorily in practice and apparently are conventionally used.

The orange elements in the picture are only seen through the blue lens, the red lens "washing out" the orange elements. For the same reason, the green-blue elements are only seen through the red lens. Hence, each eye sees only one of the two colored pictures. But because the different colored elements are horizontally shifted in varying amounts, the viewer's eyes must turn inward to properly view some elements, and turn outward to properly view others. Those elements for which the eyes turn inward, which is what the viewer does to observe a close object, are naturally perceived as close to the viewer. Elements for which the viewer's eyes turn outward are correspondingly perceived as distant. Specifically, if the blue lens covers the viewer's right eye, which generally is the present convention, then any green-blue element shifted to the left of its corresponding orange element appears to the viewer as distant or far away. The element appears more distant the greater the leftward shift. Conversely, as a green-blue element is shifted only slightly leftward, not at all, or even to the right of its corresponding red element, that element will appear increasingly closer to the viewer.

In addition to horizontally shifting the element pairs relative to each other, some users of anaglyphy for comic books also vertically shift the element pairs a slight amount relative to each other. Those users believe that the slight vertical shift improves the 3-D effect.

BRIEF SUMMARY OF THE INVENTION

Heretofore, anaglyphic 3-D prints or drawings have appeared monochromatic when viewed through 3-D glasses. The present invention improves the anaglyphic print and print process through the addition of one or more colors to one of the two colored pictures. The added colors are not limited to the colors used to render the pictures, but can be any of a great variety of colors. The addition of colors makes viewing the 3-D prints or pictures more interesting and lifelike. It does not detract from the 3-D effect, and may in some cases enhance it, since elements that appear to the viewer to have a different color than surrounding regions will tend to stand out. When the user does not wear 3-D glasses, the colors make the picture more pleasant to look at than is the case with conventional 3-D pictures.

The present invention comprises creating an anaglyph from two distinctly or approximately complementary colored pictures, such as red and blue or orange and green-blue. The elements of each picture appear in outline only, the outlines being rendered in one of the two chosen colors. The two colored pictures may be prepared on a white, off-white or lightly colored background. The interior portions of the elements of one of the two pictures are colored according to the whim or aesthetics of the designer. When viewed through 3-D glasses, the anaglyph will appear to be colored, yet still provide a 3-D effect.

It is surprising that the coloring process of the present invention does not detrimentally affect the anaglyph's ability to simulate 3-D. First, if a color (such as yellow) is added to a particular element of one of the complementary colored pictures, and if that color impinges upon the outline of the particular element, or the outline of the complementary colored element corresponding to the particular element (as will usually be the case because of overlap), then that color could mix with and change the colors of the impinged upon element outlines to ones that do not "wash out" when viewed through either the red or blue lens of the 3-D glasses. This would result in at least portions of one of the colored picture elements being viewed through both lenses of the 3-D glasses, causing unacceptable double images. Also, a chosen color, even if it did not mix with the element color, still might not wash out in either lens, again causing double images. Finally, even if a chosen color does wash out when viewed through either the red or blue lens, the print or drawing composer might have to be careful to apply the chosen color only to the picture element that washes out in the same lens as the chosen color. Otherwise, the coloring would appear to be "off-register," or placed in part outside the element. Attention to this matter would be burdensome and expensive.

It is theorized that the colored anaglyphs of the present invention do not exhibit the foregoing detrimental characteristics in part because they take advantage of the brain's tendency to make consonant, actually dissonant visual phenomena. For example, rendering blue the interior portions of an element outlined in red should cause the off-register effect described above, since the blue color will be seen through the red lens, while the orange outline of the element will be seen through the blue lens. In fact, actual tests demonstrate that while the off-register effect does appear when viewing through red-only glasses, it apparently disappears when normal 3-D glasses are used.

The present invention is particularly suited for novelty items, such as 3-D greeting cards, and for children's toys, such as coloring books, jig-saw puzzles or gameboards. Discussed below in greater detail is the present invention and the specific embodiments just referred to.

DESCRIPTION OF THE PREFERRED EMBODIMENTS

Reference throughout this description will be made to FIGS. 1 through 4, which depict a fanciful scene of a type suitable for a child's coloring or comic book.

Figure 1:
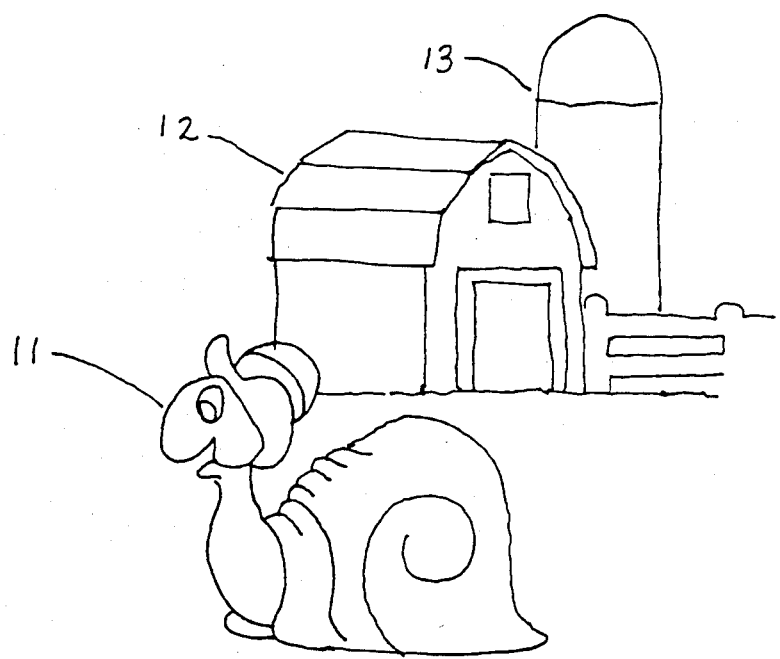
FIG. 1 is a schematic drawing depicting the elements of the first of the two pictures comprising an anaglyph.

FIG. 1 shows a snail 11, a barn 12 and a silo 13. All these elements are in outline. The color of element outlines 11, 12, and 13 in theory can be arbitrarily chosen, although the choice of their color limits the range of choices for the color of FIG. 2's elements. This is apparently because the two chosen colors preferably should be "distinct": each chosen color should appear reasonably dark when viewed through the lens of the 3-D glasses that in coloration is or approximates the other chosen color. For this reason, it is believed preferable in anaglyphy for the color of the outline approximately to be one of a complementary pair of colors. Reasonable results can be achieved, however, using specific hues of red, and blue mixed with white, as explained in greater detail below. This disclosure will therefore employ red and blue, although the present invention can employ the orange and green-blue colors that apparently are conventionally used for commercial 3-D comics and the like. The outlines of elements 11, 12 and 13 in FIG. 1 are therefore assumed approximately red in color. The interior portions of elements 11, 12 and 13 are shown uncolored in FIG. 1.

Figure 2:
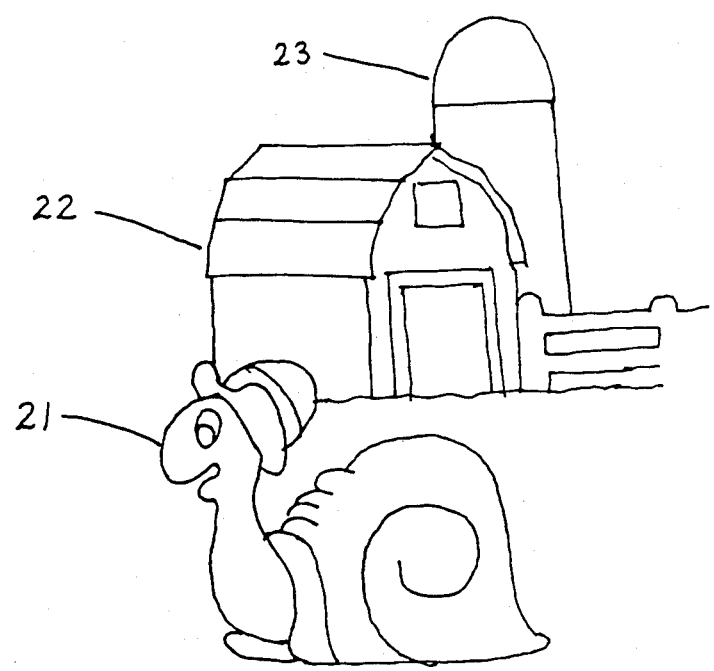
FIG. 2 is a schematic drawing depicting the elements of the second of the two pictures comprising an anaglyph.

FIG. 2, which is the second of the two picture pairs, shows a snail 21, a barn 22 and a silo 23. These figures are identical to their FIG. 1 counterparts, except that if in comparing FIG. 1 to FIG. 2, barns 12 and 22 are taken as coincident, then snail 21 is shifted to the right of snail 11 and silo 23 is shifted to the left of silo 13. Since the outline of FIG. 1's elements is approximately red, the outline of FIG. 2's elements is approximately blue.

Figure 3:
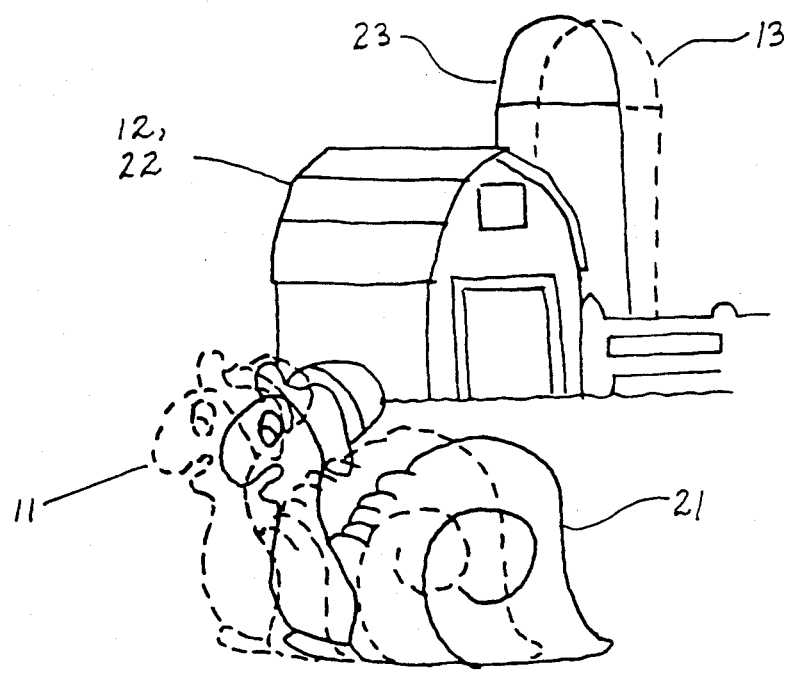
FIG. 3 is an anaglyph made from FIGS. 1 and 2, with the elements of FIG. 1 depicted by dotted lines.

The shift referred to above is clearly shown in FIG. 3, which is an anaglyph made of the elements of FIG. 1 and FIG. 2. The red elements of FIG. 1 are shown as dotted lines for clarity. FIG. 2 is intended to be viewed through 3-D glasses with the blue lens covering the right eye. When so viewed, a 3-D effect is perceived, with a single snail (made of elements 11 and 21) appearing close to the viewer, the barn behind the snail and a single silo (made of elements 13 and 23) behind the barn.

In the present invention, the elements of each picture are printed in outline. The element outlines are approximately red or blue, and the interior portions of the elements of one of the two colored pictures are given coloration. The coloration is not limited to hues that are approximately red or blue, but can be any of a great variety of colors. The interior portions of the red elements, shown in FIG. 1, or in the case of commercial offerings, the apparently orange elements, are colored in preference to the blue or green-blue elements. It has been found that coloring the interior portions of blue elements, and in the case of commercial offerings, the apparently green-blue elements, produces the off-register effect referred to earlier when viewed through the 3-D glasses. In contrast, coloring the interior portions of red elements, and in the case of commercial offerings, the apparently orange elements, has been found not to produce such an effect.

Figure 4:
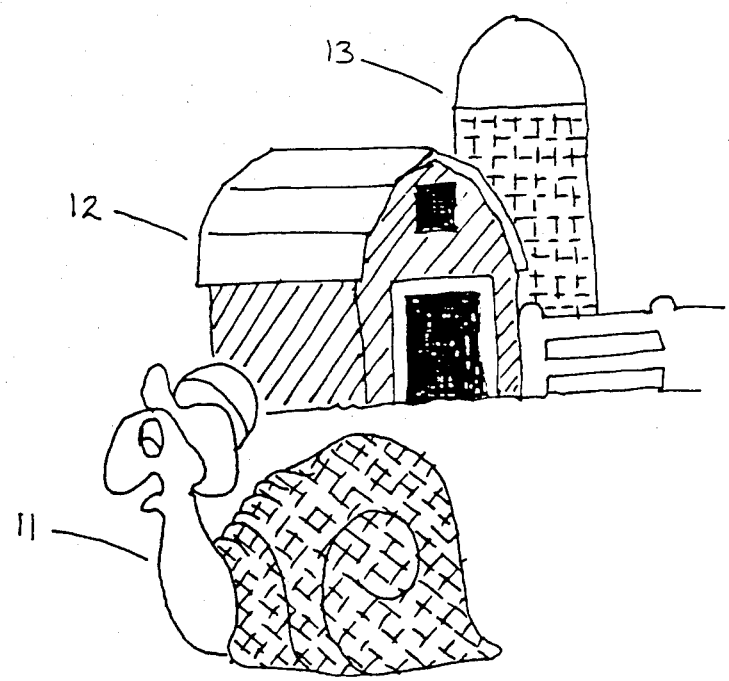
FIG. 4 is a schematic drawing depicting the elements of FIG. 1 after coloring.

FIG. 4 shows the interior portions of the red outline elements of FIG. 1 attractively colored. Snail 11's shell is colored orange, barn 12's walls are colored brown, and the cylindrical portion of silo 13 is colored yellow. When the picture is superimposed on FIG. 2, a colored 3-D anaglyph results. All the foregoing colors were arbitrarily chosen, and others are usable. It has surprisingly been found that even blue can be satisfactorily used for coloration.

Viewing the colored anaglyph through 3-D glasses slightly diminishes the ability to discriminate between colors of different hues. The more commonly used colors, including blue, green, yellow, orange, red and purple, are easily discriminated between. Viewing the colored anaglyphs through 3-D glasses also slightly changes the hues of some of the colors. It has been found that yellow retains its fidelity best.

The ability to discriminate between colors and accurately perceive their hues decreases as the lenses of the 3-D glasses become increasingly darker. On the other hand, the degree to which a color is washed out by an approximately correspondingly colored lens increases with a darker lens, and the 3-D effect is enhanced by a high degree of washing out. Balancing these two factors, it has been found preferable to use for the blue lens of the 3-D glasses blue acetate #854 by Roscolene, and red acetate #818, also by Roscolene, for the red lens.

The colors of the element outlines of the anaglyph wash out to a greater degree when they are lighter. On the other hand, darker colors are more satisfactory for element outlines if the anaglyph is intended for certain uses, such as a 3-D coloring book for children, where a crayon used by a heavy hand is more likely to obscure the lighter element outlines. Balancing these factors, it has been found preferable to use for the red element outlines red PMS 165, according to the well-known matching system of Pantone, Inc., of 55 Knickerbocker Road, Moonachie, N.J., 07074. For the blue outlines, it has been found preferable to use blue PMS 318, again as per Pantone, Inc., but mixed with an amount of white sufficient to achieve satisfactory washing out, but minimize the probability of obscuring the element outline by a crayon.

Coloration of the interior portions of the red elements can be done either as part of the printing process prior to sale, or by the user after sale, as explained below. If done as part of the printing process prior to sale, two methods of coloration present themselves. First, it is possible to first print the element outline using blue and red plates, and then print the colors within the red element outlines. Since the red and blue element outlines overlap, some blue lines will have colored ink printed on them. This overprinting does not substantially detract from the 3-D effect when the colored anaglyph is viewed through 3-D glasses, provided that transparent ink is used (which is the usual practice in printing, unless opaque ink is specified), and provided that tints, rather than full strength inks are used for coloring within the red element outlines. It has been found that tints in the range of 50% to 10% are preferred.

If coloration is done as part of the printing process, it is also possible to first print the red element outlines and then print the interior coloration, or first print the interior coloration and then the red element outlines. Thereafter, the blue element outlines can be printed, which of course results in some printing of the blue element outlines over colored interior portions of red element outlines. This has also proven satisfactory, provided that opaque blue ink, rather than transparent ink, is used for the blue element outlines. If this is done, it has also been found that full strength inks, rather than tints, can be used for coloration without substantially detracting from the 3-D effect when the colored anaglyph is viewed through 3-D glasses.

If coloration of the interior portions of the element outlines is not done prior to sale, such as would be the case if this invention is utilized for 3-D coloring books, it is preferred that a paper stock of 60-70 pounds weight be used. The color of the paper preferably is off-white, rather than pure white, and the paper preferably has a smooth finish. The smooth finish makes it more difficult for a child to dig into the picture while coloring, which might obliterate the element outlines. After printing the element outlines, the paper optionally can be varnished. Varnished paper helps to prevent the child from obliterating the blue element outlines when coloring the picture, and also allows the picture to be colored with water colors (such as is found in felt tipped pens), in addition to crayons and colored pencils.

If only water color or indelible ink marking pens are to be used as the coloring media, then a 50 to 70 lb. coated stock can be used for the paper. If coated stock is used, then it is preferable that very high gloss inks be used for the red and blue element outlines, with a minimum amount of water used in the printing process.

The present invention lends itself to the creation of novelties and toys for children. In one embodiment, a 3-D coloring book, the red and blue elements in outline are imprinted on a lightly colored, off-white or white background, in the manner shown in FIG. 3. Because the overlapping blue elements tend to obscure the outlines of the red elements, coloring the interior portions of the red elements is very difficult with the unaided eye. One solution to this problem is to provide a special air of glasses with the coloring book. These glasses have a blue lens both for the right and left eye. When worn, their effect is to wash out the blue elements of all pictures, thereby making the red elements stand out and thus vastly easier to color. The coloring book is also supplied with conventional 3-D glasses, which the user wears to view the anaglyphs in 3-D.

Another solution is to minimize the interior detail lines of the red and blue element outlines. Referring to FIGS. 1 and 2, it is seen that the snail's shell contains many detail lines within its overall outline. When combined, as shown in FIG. 3, it can be readily seen that visually discerning for coloring the red outline of the shell is made difficult by the many interior detail lines. Minimization of these lines makes visually discerning the red outline sufficiently easier such that it is unnecessary when coloring to wear glasses having a blue lens for both the right and left eye. Interior detail can still be obtained by at least partially substituting shading for the interior detail lines; shading can be satisfactorily produced with commercially available shading sheets, such as those marketed by Letraset U.S.A. Inc., Paramus, N.J. Such shading can also be used near the periphery of an element, adjacent its outline, to highlight changes in depth from element to element. This use of shading will also tend to discourage a child from coloring in the shaded area, thereby minimizing the probability of the child's coloring mask an element outline.

Optionally, the coloring book can be supplied with crayons or colroed pencils having colors selected, for example, for their hue fidelity when viewed through 3-D glasses.

Jig-saw puzzles benefit from utilization of the present invention. Heretofore, jig-saw puzzles would not lend themselves to 3-D treatment because of their dull, unexciting, monochromatic appearance when viewed through 3-D glasses. However, orange and green-blue outline elements of a 3-D anaglyph can be colored as per this disclosure and used as the picture of a jig-saw puzzle. This opens up many novel possibilities to the uses. He can, for example, assemble the puzzle without 3-D glasses by identifying adjacent pieces as those with similarly shifted orange and green-blue element outlines. Alternately, he can assemble the puzzle while wearing 3-D glasses, using color and depth for finding adjacent pieces.

It is also possible to use the present invention for gameboards. Pictures on the gameboard can be created in accordance with the present disclosure to provide colored 3-D images when viewed through 3-D glasses. Such images lend themselves well, for example, to gameboards that require the player to advance by climbing ladders and sliding down chutes, both of which are drawn on the gameboard.

The present invention further lends itself to use for novelty items, such as 3-D greeting cards. The card can be imprinted with colored 3-D anaglyphs, in accordance with the present invention, and sold with 3-D glasses.

I claim:

1. A method of making a colored anaglyphic picture that will appear both three-dimensional and in color when viewed through glasses having a first lens colored approximately blue and a second lens colored approximately red, the method comprising:
    (a) preparing on a background a first outline representation of an object, the first outline being printed with a colored ink selected from the group consisting of ink approximately orange in color and ink approximately red in color;
    (b) preparing on the same background, a second outline representation of the object, the second outline representation having the same shape as the first representation but being printed with a colroed ink selected from the group consisting of ink approximately green-blue in color and ink approximately blue in color, and being horizontally shifted on the background relative to the first outline of said object;
    (c) viewing the anaglyph through first glasses having both lenses approximately blue in color;
    (d) while viewing the anaglyph through the first glasses, coloring the interior portions of the orange or red outline, of said object, in a color other than the color of the orange or red outline, which outline when so viewed will stand out relative to the green-blue or blue outline;
    (e) viewing the 3-D anaglyph through second glasses having a first lens colored approximately blue and a second lens colored approximately red; whereby the object will appear both 3-dimensional and in color.

2. A method of preparing a colored anaglyphic picture from an anaglyph having a pair of picture elements in outline, one outline being approximately blue in color and the other approximately red in color, the anaglyph appearing both three-dimensional and in color when viewed through 3-D glasses, the method comprising:

(a) viewing the anaglyph through colored glasses, both of the lenses of the glasses being approximately blue in color, and while so viewing:

(b) coloring the visible elements.

3. A method of making a colored anaglyphic picture, the anaglyph appearing both three-dimensional and in color when viewed through 3-D glasses, the method comprising:

(a) preparing on a background a first outline representation of an object, the first outline printed with a colored ink selected from the group consisting of ink approximately orange in color and ink approximately red in color;

(b) preparing on the same background, a second outline representation of the object, the second outline representation having the same shape as the first representation but being printed with a colored ink selected from the group consisting of ink approximately green-blue in color and ink approximately blue in color, and being horizontally shifted on the background relative to the first outline of said object;

(c) coloring the interior portions of the orange or red outline, of said object in a color other than the color of the orange or red outline, whereby, upon viewing the 3-D anaglyph through 3-D gasses, the object will appear both 3-dimensional and in color.

4. The method as in claim 3, wherein step (c) comprises coloring the interior portions of the orange or red outline, with a color tint, other than the color of the orange or red outline, in the range of 50% to 10% the full strength of the color of the color tint.

5. A method of making a colored anaglyphic picture, the anaglyph appearing both three-dimensional and in color when viewed through 3-D glasses, comprising:

(a) preparing on a background a first outline representation of an object, the first outline being printed with a colored ink selected from the group consisting of ink approximately orange in color and ink approximately red in color;

(b) coloring, that portion of the background inside the outline prepared in step(a);

(c) subsequent to completion of steps (a) and (b), preparing on the background a second outline representation of the object, the second outline representation having the same shape as the first representation but printed with an opaque colored ink selected from the group consisting of ink approximately green-blue in color and ink approximately blue in color;

whereby upon viewing the 3-D anaglyph through 3-D glasses, the object will appear both dimensional and in color.

6. A colored anaglyph, which appears both three-dimensional and in color when viewed through 3-D glasses, comprising:

(a) an outline representation of an object, the outline being approximately red in color and prepared on a background;

(b) a second outline representation of said object prepared on said background, the second outline being approximately blue in color and horizontally shifted relative to the orange outline of said object;

(c) the interior portions of the red outline representation being colored in a color other than red.

7. The colored 3-D anaglyph of claim 6, wherein the anaglyph comprises a picture on a jig-saw puzzle.

8. The colored 3-D anaglyph of claim 6, wherein the anaglyph comprises a picture on a gameboard.

9. The colored 3-D anaglyph of claim 6, wherein the anaglyph comprises a picture on a greeting card.

10. A coloring book kit for creating colored 3-D anaglyphic pictures that will appear both three-dimensional and in color when viewed through glasses having a first lens colored approximately blue and a second lens colored approximately red, comprising:

(a) a coloring book of anaglyphic pictures, each anaglyph being:

(i) a first outline representation of an object, the outline being prepared on a background and printed with a colored ink selected from the group consisting of ink approximately red in color and ink approximately orange in color; and (ii) a second outline representation of said object prepared on said background, the second outline being printed with a colored ink selected from the group consisting of ink approximately blue in color and ink approximately green-blue in color, said second outline being horizontally shifted relative to the first outline of said object;

(b) first glasses with both lenses approximately blue in color for use while coloring the anaglyphs; and (c) second glasses with a first lens approximately red in color and a second lens approximately blue in color for viewing the anaglyphs in 3-D; and (d) instructions for using the coloring book, first glasses and second glasses to create and view colored 3-D anaglyphic pictures, the instructions being:

(i) viewing one of the anaglyphs of the coloring book through the first glasses;

(ii) while viewing the anaglyph through the first glasses, coloring the interior portions of the orange or red outline of said object; and (iii) viewing the colored anaglyph through the second glasses.

11. A 3-D anaglyphic coloring book kit for creating colored 3-D anaglyphic pictures that will appear both three-dimensional and in color when viewed through glasses having a first lens colored approximately blue and a second lens colored approximately red, comprising:

(a) a coloring book of anaglyphic pictures, each anaglyph being:

(i) a first outline representation of an object, the outline being prepared on a background and printed with a colored ink selected from the group consisting of ink approximately red in color and ink approximately orange in color; and (ii) a second outline representation of said object prepared on said background, the second outline printed with a colored ink selected from the group consisting of ink approximately blue in color and ink approximately green-blue in color, said second outline being horizontally shifted relative to the first outline of said object;

(b) glasses with a first lens approximately red in color and a second lens approximately blue in color for viewing the anaglyphs in 3-D; and (c) instructions for using the coloring book and glasses to create and view colored 3-D anaglyphic pictures, the instructions being:
   (i) coloring the interior portions of the red element outline of one of the anaglyphs contained in the coloring book; and
   (ii) viewing the colored anaglyphs through the glasses.

12. A 3-D anaglyphic coloring kit for creating a colored 3-D anaglyphic picture that will appear both three-dimensional and in color when viewed through glasses having a first lens colored approximately blue and a second lens colored approximately red, comprising:

(a) an anaglyphic picture comprising:
   (i) a first outline representation of an object, the outline being prepared on a background and printed with a colored ink selected from the group consisting of ink approximately red in color and ink approximately orange in color; and
   (ii) a second outline representation of said object prepared on said background, the second outline printed with a colored ink selected from the group consisting of ink approximately blue in color and ink approximately green-blue in color, said second outline being horizontally shifted relative to the first outline of said object;

(b) glasses with a first lens approximately red in color and a second lens approximately blue in color for viewing the anaglyph in 3-D; and (c) instructions for creating and viewing a colored 3-D anaglyphic picture, the instructions being:
   (i) coloring the interior portions of the red or orange element outline of the anaglyph; and
   (ii) viewing the colored anaglyph through the glasses.

13. The kit as in claim 12, wherein the kit additionally includes a plurality of colored pencils.

* * * * *